June 28, 1960  G. K. TURNER  2,942,476
LOW FREQUENCY ANGULAR ACCELEROMETER
Filed Dec. 23, 1955

INVENTOR.
GEORGE K. TURNER
BY
*William R. Lane*
ATTORNEY

United States Patent Office 2,942,476
Patented June 28, 1960

2,942,476

LOW FREQUENCY ANGULAR ACCELEROMETER

George K. Turner, Palo Alto, Calif., assignor to North American Aviation, Inc.

Filed Dec. 23, 1955, Ser. No. 555,091

5 Claims. (Cl. 73—517)

This invention pertains to a measurement of acceleration. It more particularly relates to a device for measuring the angular acceleration of a rotating shaft.

Devices for measuring accelerations of a shaft find a wide use in the fields of automatic machine controllers, servo loops, anticipator devices for angular velocity regulators, and various computer circuits. In computers complicated mathematical equations are solved calling for calculations in which a differential is required. The measurement of acceleration of a shaft is the first derivative of the angular velocity of the shaft. A velocity input to the shaft is converted to a measurement of the acceleration of the shaft by the device of this invention, thus providing a simple and accurate method for obtaining a differential.

A particular feature of this accelerometer lies in the fact that a completely closed loop servo system is used providing greater accuracy than can be obtained in present accelerometers. In addition, a simple system for reading the output of the rotating shaft is provided making the accelerometer readily adaptable to uses in complicated computer circuits.

It is therefore an object of this invention to provide an improved accelerometer.

It is a further object of this invention to provide a mechanical device to measure the angular acceleration of a shaft.

It is another object of this invention to provide an acceleration sensitive device which is of relatively simple construction.

It is a further object of this invention to provide an accurate acceleration sensitive device which indicates the first derivative of the angular velocity of the shaft.

It is still another object of this invention to provide a device which gives an output accurately proportional to the angular acceleration of a shaft.

Other objects of invention will become apparent from the following description taken in connection with accompanying drawings, in which.

Figure 1:
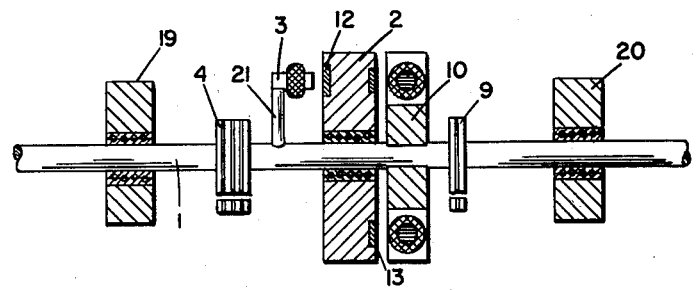
Fig. 1 is a plan view of the acceleration sensitive portion of this invention.

Referring now to Fig. 1, shaft 1 is supported by frames 19 and 20 which may be of any similar frames, cases or housings which are adapted with bearings to house a shaft. Disc 2 is mounted on shaft 1 and is adapted for rotation with respect thereto. Disc 2 can be bearing mounted, floated, suspended, or mounted on shaft 1 by any suitable means having minimum friction.

Extending from and attached rigidly to shaft 1 is an arm 21 constituting a part of a pickoff system adapted to measure the angular deflection of shaft 1 with respect to disc 2. Pickoff 3 supported by arm 21 may be of any suitable type producing an electrical signal output corresponding in direction and magnitude to the direction and magnitude of relative displacement between shaft 1 and disc 2. Soft iron slug 12 attached to disc 2 is originally positioned opposite pickoff 3 so that it is centralized with respect to core 23 of pickoff 3. Other type pickoffs which are noncoercive in nature, such as capacitive or optical pickoffs, are likewise suitable.

Slip ring 4 mounted on shaft 1 and rotating therewith operates to receive the electrical output of pickoff 3 and transfer this output to stationary electronic means. Similarly, slip ring 9 mounted on shaft 1 operates to transfer an electrical signal from stationary electronic means to torquer 10. Torquer 10, attached to shaft 1, has two coils 11 which in cooperation with permanent magnets 13 and 14 attached to disc 2 act as a torquing device to return the disc to its normal position with respect to shaft 1.

Figure 2:
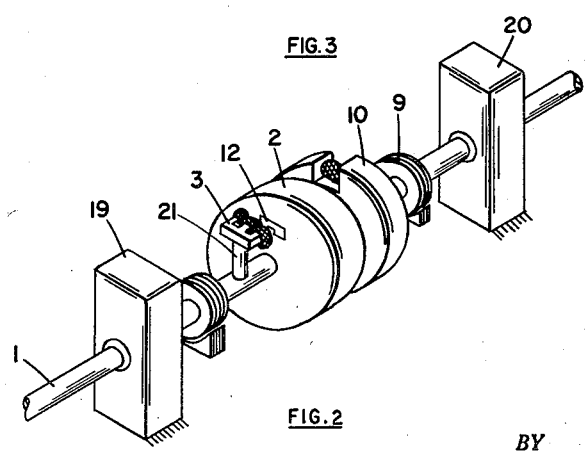
Fig. 2 is a rudimentary perspective of the device showing the operation of the pickoff and torquer.

Fig. 2 is a rudimentary perspective of the device and indicates more particularly the relation of pickoff 3 to soft iron slug 12, the soft iron slug 12 and torquer 10 to permanent magnets 13 and 14.

As stated above, one of the objects of this invention is to provide an accurate acceleration sensitive device which indicates the first derivative of the angular velocity of the shaft. When a shaft is caused to rotate at an angular velocity proportional to an input signal, the shaft accelerates in such a manner that the acceleration is directly proportional to the first derivative of the angular velocity applied to such shaft. The acceleration is therefore the first differential of velocity and by measuring this acceleration a differential computer is thereby produced.

Figure 3:
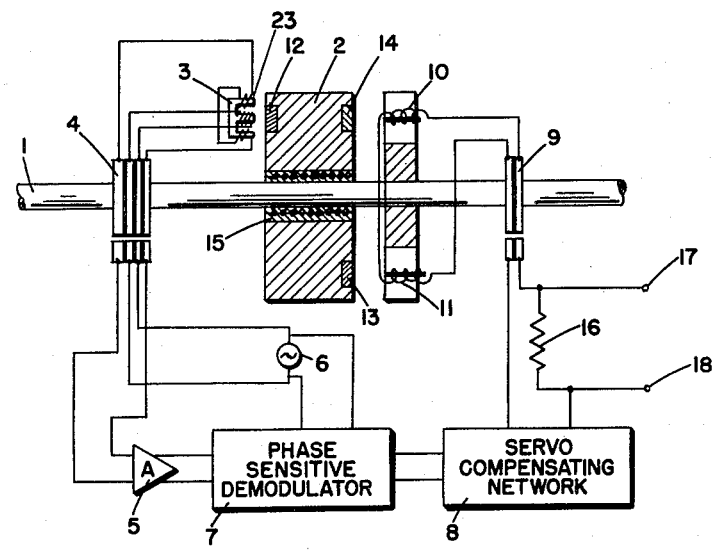
Fig. 3 is a schematic diagram of the electrical circuit of the device.

In the schematic of Fig. 3 is shown the operation of this accelerometer. When an acceleration is imparted to shaft 1, shaft 1 rotates with respect to disc 2 on suitable bearing means 15 thereby creating an angular deflection between core 23 of pickoff 3 and soft iron slug 12 of disc 2. Pickoff 3 is illustrated as being of the inductive E-transformer type, having a three legged or E-shaped core 23, each leg of which bears a winding, the winding of the center leg being energized from a suitable source of alternating voltage 6, and the windings of the outer legs being connected in series opposition to the output circuit. When iron slug 12 is centralized with respect to core 23 equal and opposite voltages will be induced in the outer coils of pickoff 3, and the resultant output voltage is zero. Should iron slug 12 vary in either direction from this central position because of rotation of shaft 1 with respect to disc 2, one of the outer coils of pickoff 3 will have induced therein a greater voltage than the other, and the output voltage will then be a reversible phase voltage corresponding in phase to the direction of this relative displacement and in magnitude to the amount of the displacement.

As disc 2 is deflected to one side or the other with respect to shaft 1 a signal is sent via slip ring 4 to amplifier 5 which in turn provides an output signal to phase sensitive demodulator 7. Demodulator 7 receives a reference frequency from A.-C. voltage source and provides a D.-C. signal output whose polarity indicates the direction of deflection of disc 2 with respect to shaft 1 and whose amplitude indicates the amount of angular deflection. The output of demodulator 7 flows through a servo stabilizing or compensating network 8. Such networks are well-known in the art. The network output is fed through resistor 16 and slip ring 9 to coils 11 of torquer 10. The current flowing through coils 11 acts to deflect permanent magnets 13 and 14 on disc 2 and return disc 2 to the preselected null position between shaft 1 and disc 2.

As shaft 1 commences to rotate pickoff 3 becomes relatively unbalanced. A.-C. source 6 excites the center limb of E core 23 and soft iron slug 12 magnetically couples the excitation into the oppositely wound outer limbs. If pickoff 3 through shaft 1 is deflected to one side or the other, one limb of core 23 is better coupled to the center limb thereby providing an output signal to amplifier 5 which is amplitude modulated and phase reversible and thus indicates the deviation of disc 2 and shaft 1 from their preselected null position with respect to each other. The torque applied to disc 2 through permanent magnets 13 and 14 by torquer 10 is always equal and opposite to the torque output of pickoff 3. The current through torquer coils 11 cause a proportional torque to be exerted on disc 2 through permanent magnets 13 and 14 in an opposite direction to the torque detected by pickoff 3 causing disc 2 to take on an angular acceleration proportional in magnitude to the current from torquer 10 and in direction opposite to the direction sensed by pickoff 3. The current which is applied to torquer 10 also flows through resistor 16 and is proportional to the current received from pickoff 3. The voltage drop across resistor 16 is thereby proportional to the acceleration of shaft 1. Output terminals 17 and 18 connected to suitable well-known instrumentation provide an accurate measurement of the angular acceleration of shaft 1.

It is to be noted that pickoff 3 and disc 2 must initially be put in electrical balance by rotating disc 2 with respect to shaft 1 until the output detected through pickoff 3 indicates zero. This then is the preselected null position.

In summary, then, a closed loop servo control system operates to maintain the angular displacement between shaft 1 and disc 2 in the preselected null position. The current supplied to torquer 10 is directly proportional to the angular displacement of disc 2 with respect to shaft 1 and therefore torque 10 will continue to torque disc 1 through permanent magnets 13 and 14 in a direction opposite to the angular deflection of disc 2 with respect to shaft 1 as detected by pickoff 3. Thus, it can be seen that disc 2 temporarily deflected with respect to shaft 1 because of rotation is returned to its preselected null position by torquer 10 in response to pickoff 3. Depending upon the tightness of the servo loop, disc 2 will be maintained in substantially a preselected null position with respect to shaft 1 and only incipient deflection will occur.

The current supplied by the electric means connected to pickoff 3 is directly proportional to the torque required to return disc 2 to the preselected null position with respect to shaft 1. Therefore, a measurement of this current is also directly proportional to the angular acceleration of shaft 1. This measurement is obtained by inserting resistor 16 in series with torquer 10 and the output from servo compensating network 8 and utilizing well-known means to measure the voltage drop across resistor 16.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In combination, a shaft responsive to angular acceleration, a disc coaxial with said shaft, and rotatably mounted pickoff means disposed relative to said shaft and said disc to detect angular displacement relative to a preselected null position between said shaft and said disc, electronic means responsive to the output of said pickoff means, said electronic means being a measurement of the angular deflection of said shaft relative to said disc, torquer means connected to receive the output of said electronic means, said torquer means disposed to torque said disc in accordance with the output signal from said electronic means whereby said disc and said shaft are maintained in said preselected null position.

2. In combination, a shaft responsive to angular acceleration, a disc coaxial with said shaft and rotatably mounted, electromagnetic pickoff means sensitive to the angular displacement relative to a preselected null position between said shaft and said disc for producing a phase reversible amplitude modulated signal, means for amplifying said modulated signal, demodulating means connected to receive said modulated signal, torquer means connected to receive the output of said demodulator means, said torquer means disposed to torque said disc in accordance with the output signal from said demodulator means so as to maintain said disc and said shaft in said preselected null position.

3. The combination recited in claim 2 wherein said modulating means and said pickoffs provide amplitude modulated, phase-reversible signals indicating by their phase the direction of angular deflection detected by said pickoffs and by their amplitude, the amount of deflection of said pickoffs, and said demodulators are phase-sensitive so as to provide a D.-C. output whose polarity indicates direction of deflection of said pickoffs and whose magnitude indicates the amount of deflection of said pickoffs.

4. In an accelerometer, a shaft responsive to angular acceleration, a disc coaxial with said shaft and rotatably mounted, magnetic pickoff means sensitive to the angular displacement relative to a preselected null position between said shaft and said disc for producing a phase reversible amplitude modulated signal, demodulating means connected to receive said modulated signal, said demodulating means being a measurement of the angular acceleration of said shaft, torquer means connected to receive the output of said demodulator means, said torquer means disposed to torque said disc in accordance with the output signal from said demodulator means so as to maintain said disc and said shaft in said preselected null position.

5. In an accelerometer, a shaft responsive to angular acceleration, a disc coaxial with said shaft and rotatably mounted, magnetic pickoff means sensitive to the angular displacement relative to a preselected null position between said shaft and said disc, said pickoff means providing amplitude modulated, phase-reversible signals indicating by its phase the direction of angular displacement detected by said pickoff and by its magnitude, the amount of displacement detected by said pickoff, means for amplifying said signal, phase-sensitive demodulating means connected to receive said modulator signal, means for indicating the magnitude of the output of said demodulator to thereby measure the acceleration to which said shaft is responsive, torquer means connected to receive the output of said demodulator means, said torquer means disposed to torque said disc in accordance with the output signal from said demodulator means so as to maintain said disc and said shaft in said preselected null position.

References Cited in the file of this patent

UNITED STATES PATENTS

| | | |
|---|---|---|
| 2,132,959 | McCune | Oct. 11, 1938 |
| 2,498,118 | Weiss | Feb. 21, 1950 |
| 2,591,921 | Cosgriff et al. | Apr. 8, 1952 |
| 2,606,310 | Baker | Aug. 5, 1952 |
| 2,629,859 | Taylor | Feb. 24, 1953 |
| 2,672,334 | Chenery | Mar. 16, 1954 |
| 2,801,097 | Adamson | July 30, 1957 |

FOREIGN PATENTS

| | | |
|---|---|---|
| 470,454 | Germany | Jan. 15, 1929 |